United States Patent
Rajput et al.

(10) Patent No.: US 11,582,258 B2
(45) Date of Patent: Feb. 14, 2023

(54) METHODS, SYSTEMS, AND COMPUTER READABLE MEDIA FOR MITIGATING DENIAL OF SERVICE (DOS) ATTACKS AT NETWORK FUNCTIONS (NFS)

(71) Applicant: Oracle International Corporation, Redwood Shores, CA (US)

(72) Inventors: Jay Rajput, Bangalore (IN); Virendra Singh, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 100 days.

(21) Appl. No.: 17/167,319

(22) Filed: Feb. 4, 2021

(65) Prior Publication Data
US 2022/0247779 A1    Aug. 4, 2022

(51) Int. Cl.
*H04L 9/40*    (2022.01)
(52) U.S. Cl.
CPC .......... *H04L 63/1458* (2013.01); *H04L 63/20* (2013.01); *H04L 2463/142* (2013.01)
(58) Field of Classification Search
None
See application file for complete search history.

(56) References Cited

U.S. PATENT DOCUMENTS 6,327,350 B1    12/2001    Spangler et al.
7,145,875 B2    12/2006    Allison et al.
(Continued)

FOREIGN PATENT DOCUMENTS

CN    110830422 B   *   4/2022   ............ H04L 43/10

OTHER PUBLICATIONS

Sattar, Danish et al., "Towards Secure Slicing: Using Slice Isolation to Mitigate DDoS Attacks on 5G Core Network Slices", 7th Annual IEEE Conference on Communications and Network Security (CNS 2019), Washington, DC, USA, Jun. 10-12, 2019, 10 pages. (Year: 2019).*

(Continued)

*Primary Examiner* — Michael Pyzocha
(74) *Attorney, Agent, or Firm* — Jenkins, Wilson, Taylor & Hunt, P.A.

(57) ABSTRACT

A method for DoS attacks at an NF includes maintaining, at a first NF, an NF subscription database containing rules that specify maximum numbers of allowed subscriptions and corresponding rule criteria. The method further includes receiving, at the first NF and from a second NF, a subscription request for establishing a subscription. The method further includes determining, by the first NF, that the subscription request matches criteria for at least one rule in the NF subscription database and incrementing, by the first NF, at least one count of a number of subscriptions for the at least one rule. The method further includes determining, by the first NF, that the at least one count of the number of subscriptions exceeds a maximum number of allowed subscriptions for the at least one rule. The method further includes, in response to determining that the at least one count of the number of subscriptions exceeds the maximum number of allowed subscriptions for the at least one rule, preventing establishment of the subscription.

20 Claims, 7 Drawing Sheets

(56) References Cited

U.S. PATENT DOCUMENTS

| | | | |
|---|---|---|---|
| 7,206,394 | B2 | 4/2007 | Baldwin et al. |
| 7,774,849 | B2 | 8/2010 | Russell et al. |
| 8,613,073 | B2 | 12/2013 | McCann et al. |
| 8,958,306 | B2 | 2/2015 | McCann et al. |
| 9,647,986 | B2 | 5/2017 | McCann et al. |
| 10,382,340 | B1* | 8/2019 | Das .................. H04L 47/24 |
| 10,819,636 | B1* | 10/2020 | Goel .................. H04L 47/10 |
| 11,310,731 | B1* | 4/2022 | Feder .................. H04W 36/32 |
| 2006/0146857 | A1* | 7/2006 | Naik .................. H04L 12/1428 370/432 |
| 2018/0324583 | A1* | 11/2018 | Nair .................. H04W 12/033 |
| 2018/0324671 | A1* | 11/2018 | Palnati .............. H04L 63/0876 |
| 2019/0253388 | A1* | 8/2019 | Verma .................. H04W 12/088 |
| 2019/0306189 | A1 | 10/2019 | Torgerson et al. |
| 2019/0356635 | A1* | 11/2019 | Chiang .............. H04L 65/1104 |
| 2020/0252813 | A1* | 8/2020 | Li .................. G06Q 20/382 |
| 2021/0112079 | A1* | 4/2021 | Campo Trapero .................. H04L 63/1441 |
| 2021/0112443 | A1* | 4/2021 | Krishan .............. H04W 28/0842 |
| 2021/0185538 | A1* | 6/2021 | Zhang .................. H04L 63/105 |
| 2021/0320844 | A1* | 10/2021 | Kumar .............. H04L 41/0893 |
| 2022/0124015 | A1* | 4/2022 | Khare .................. H04L 43/06 |
| 2022/0124478 | A1* | 4/2022 | Moore .................. H04W 8/12 |
| 2022/0166790 | A1* | 5/2022 | Koral .................. H04L 63/1416 |
| 2022/0182835 | A1* | 6/2022 | Rajput .................. H04W 12/04 |
| 2022/0272619 | A1* | 8/2022 | Garcia Azorero ...... H04W 4/08 |

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

Notification of Transmittal of the International Search Report and the Written Opinion of the International Searching Authority, or the Declaration for International Application No. PCT/US2022/013367 (dated Apr. 7, 2022).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

* cited by examiner

METHODS, SYSTEMS, AND COMPUTER READABLE MEDIA FOR MITIGATING DENIAL OF SERVICE (DOS) ATTACKS AT NETWORK FUNCTIONS (NFS)

TECHNICAL FIELD

The subject matter described herein relates to network security. More particularly, the subject matter described herein relates to methods, systems, and computer readable media for mitigating DoS attacks at NFs, such as 5G producer NFs.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks occurs when a producer NF becomes overwhelmed due to high numbers of subscription requests. Almost all NFs in 5G networks use the subscribe/notify mechanism for communication. In the subscribe/notify mechanism for communication, a consumer NF subscribes with a producer NF to be notified about a producer NF. For example, the NRF uses subscribe/notify communications to be notified when a consumer NF wishes to know about network topology changes. The uified data management node (UDM) uses subscribe/notify communications to let consumer NFs know about subscriber data changes. The network slice selection function (NSSF) uses subscribe/notify communications to let the AMF know about changes in single network slice selection assistance information (S-NSSAI). The policy control function (PCF) uses subscribe/notify communications to let consumer NFs know about policy control events.

If the number of subscriptions at the producer NF causes the processing capabilities of the producer NF to be overwhelmed, service may be denied to consumer NFs seeking to be notified of NF service profiles or other information. Currently, producer NFs do not limit the number of subscriptions that can be created by a consumer NF. Excessive numbers of NF subscriptions at a producer NF can be created by the consumer NF, intentionally or accidentally, resulting in denial of service to other NFs seeking to access the service provided by the producer NF. Denial of service can be caused by exhaustion of the storage capacity of the producer NF due to too many subscription records. Denial of service can also result if the CPU of the producer NF is exhausted due to excessive processing demand. Memory resources of the producer NF may also be exhausted if the number of subscription records being processed exceeds the memory capacity of the producer NF. Denial of service can also be caused by network resource exhaustion due to unwanted processing overhead for subscription responses. Note that other operations (e.g., NF registration with the NRF) do not suffer from the same problem as subscriptions, as the content of the message (the NF instance ID in the registration request) helps make sure that multiple registrations cannot be created for the same NF instance. However, there is no such protection in or for subscribe messages.

Accordingly, there exists a need for methods, systems, and computer readable media for mitigating DoS attacks at an NF.

SUMMARY

A method for mitigating denial of service (DoS) attacks at a network function (NF). The method includes maintaining, at a first NF, an NF subscription database containing rules that specify maximum numbers of allowed subscriptions and corresponding rule criteria. The method further includes receiving, at the first NF and from a second NF, a subscription request for establishing a subscription. The method further includes determining, by the first NF, that the subscription request matches criteria for at least one rule in the NF subscription database. The method further includes incrementing, by the first NF, at least one count of a number of subscriptions for the at least one rule. The method further includes determining, by the first NF, that the at least one count of the number of subscriptions exceeds a maximum number of allowed subscriptions for the at least one rule. The method further includes, in response to determining that the at least one count of the number of subscriptions exceeds the maximum number of allowed subscriptions for the at least one rule, preventing establishment of the subscription.

According to another aspect of the subject matter described herein, the first NF comprises a producer NF.

According to another aspect of the subject matter described herein, the first NF comprises a service communication proxy (SCP).

According to another aspect of the subject matter described herein, maintaining the NF subscription database includes maintaining the database with at least one rule with criteria specifying NF type.

According to another aspect of the subject matter described herein, accessing the NF subscription database includes extracting or inferring NF type information from the subscription request and using the NF type information extracted or inferred from the subscription request as a key to match against the criteria specified for the rules in the database.

According to another aspect of the subject matter described herein, maintaining the NF subscription database includes maintaining the database with at least one rule specifying criteria of public land mobile network (PLMN).

According to another aspect of the subject matter described herein, accessing the NF subscription database includes extracting or inferring PLMN information of the second NF from the subscription request and using the PLMN information of the second NF extracted or inferred from the subscription request as a key to match against the criteria specified for the rules in the database.

According to another aspect of the subject matter described herein, maintaining the NF subscription database includes maintaining the database with at least one rule specifying criteria of NF instance ID and wherein accessing the NF subscription database includes extracting an NF instance ID from the subscription request and using the NF instance ID extracted from the subscription request as a key to match against the criteria specified for the rules in the database.

According to another aspect of the subject matter described herein, maintaining the NF subscription database includes maintaining a count of a number of subscriptions currently being handled by the first NF that match the criteria for each of the rules.

According to another aspect of the subject matter described herein determining, by the first NF, that the subscription request matches criteria for at least one rule in the NF subscription database includes determining that the subscription request matches criteria for a plurality of rules in the database; incrementing, by the first NF, at least one count of a number of subscriptions for the at least one rule includes incrementing the count for each of the rules with criteria that match the subscription request; and determining, by the first NF, that the at least one count of the number of subscriptions exceeds a maximum number of allowed subscriptions for the at least one rule includes determining that the count of the number of subscriptions for any of the rules with criteria that match the subscription request exceeds the maximum number of allowed subscriptions for the rule.

According to another aspect of the subject matter described herein, a system for mitigating denial of service (DoS) attacks at a network function (NF) is provided. The system includes a first NF including at least one processor and a memory. The system further includes an NF subscription database embodied in the memory and containing rules that specify maximum numbers of allowed subscriptions and corresponding rule criteria. The system further includes an NF subscription policer for receiving, from a second NF, a subscription request for establishing a subscription, determining, that the subscription request matches criteria for at least one rule in the NF subscription database, incrementing, at least one count of a number of subscriptions for the at least one rule, determining, that the at least one count of the number of subscriptions exceeds a maximum number of allowed subscriptions for the at least one rule, and, in response to determining that the at least one count of the number of subscriptions exceeds the maximum number of allowed subscriptions for the at least one rule, preventing establishment of the subscription.

According to another aspect of the subject matter described herein, the NF subscription database includes at least one rule with criteria specifying an NF type.

According to another aspect of the subject matter described herein, in accessing the NF subscription database, the NF subscription policer is configured to extract or infer NF type information of the second NF from the subscription request and use the NF type information of the second NF extracted or inferred from the subscription request as a key to match against the criteria specified for the rules in the database.

According to another aspect of the subject matter described herein, the NF subscription database includes at least one rule with criteria specifying a public land mobile network (PLMN) and wherein, in accessing the NF subscription database, the NF subscription policer is configured to extract or infer a PLMN identifier for the second NF from the subscription request and use the PLMN identifier extracted or inferred from the subscription request as a key to match against the criteria specified for the rules in the database.

According to another aspect of the subject matter described herein, the NF subscription database includes at least one rule with criteria specifying an NF instance ID and wherein, in accessing the NF subscription database, the NF subscription policer is configured to extract an NF instance ID from the subscription request and use the NF instance ID extracted from the subscription request as a key to match against the criteria specified for the rules in the database.

According to another aspect of the subject matter described herein, the NF subscription policer is configured to maintain a count of a current number of subscriptions being handled by the first NF that match criteria for each of the rules.

According to another aspect of the subject matter described herein, in determining that the subscription request matches criteria for at least one rule in the NF subscription database, the NF subscription policer is configured to determine that the subscription request matches criteria for a plurality of rules in the database; in incrementing at least one count of a number of subscriptions for the at least one rule, the NF subscription policer is configured to increment the count for each of the rules with criteria that match the subscription request; and in determining that the at least one count of the number of subscriptions exceeds a maximum number of allowed subscriptions for the at least one rule, the NF subscription policer is configured to determine that the count of the number of subscriptions for any of the rules with criteria that match the subscription request exceeds the maximum number of allowed subscriptions for the rule.

According to another aspect of the subject matter described herein, a non-transitory computer readable medium having stored thereon executable instructions that when executed by a processor of a computer control the computer to perform steps is provided. The steps include maintaining, at a first network function (NF), an NF subscription database containing rules that specify maximum numbers of allowed subscriptions and corresponding rule criteria. The steps further include receiving, at the first NF and from a second NF, a subscription request for establishing a subscription. The steps further include determining, by the first NF, that the subscription request matches criteria for at least one rule in the NF subscription database. The steps further include incrementing, by the first NF, at least one count of a number of subscriptions for the at least one rule. The steps further include determining, by the first NF, that the at least one count of the number of subscriptions exceeds a maximum number of allowed subscriptions for the at least one rule. The steps further include, in response to determining that the at least one count of the number of subscriptions exceeds the maximum number of allowed subscriptions for the at least one rule, preventing establishment of the subscription.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
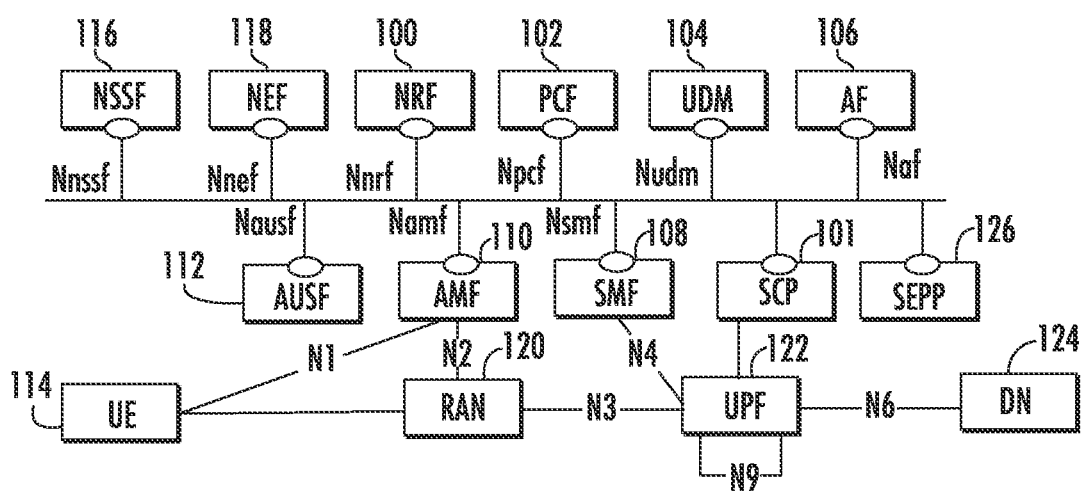
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

Figure 2:
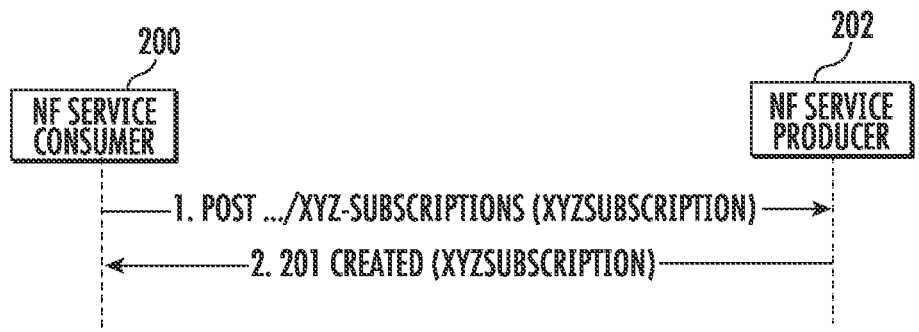
FIG. 2 is a message flow diagram illustrating exemplary messages exchanged for creating a subscription with a producer NF.

As described above, one problem with the 3GPP network architecture for 5G networks is that a producer NF can become overwhelmed with processing resulting from excessive subscriptions from consumer NFs. FIG. 2 is a message flow diagram illustrating exemplary messages exchanged between an NF service consumer and an NF service producer in creating a subscription. Referring to FIG. 2, a NF service consumer 200 may be any of the NFs illustrated in FIG. 1 that subscribes to other NFs. NF service producer 202 may be any of the NFs illustrated in FIG. 1 that processes subscriptions. Referring to the message flow in FIG. 2, in line 1, in NF service consumer 200 sends an HTTP Post request to NF service producer 202. The HTTP Post request includes a callback URI that contains additional criteria to filter the set of events that trigger a notification. In line 2 of the message flow diagram NF service producer 202 since a 201 Created message to NF service consumer 200. The 201 Created message indicates that the subscription has been created.

Creating and maintaining a subscription utilizes processing, memory, and storage resources of NF service producer 202. For example, a record corresponding to the subscription must be created in a subscription database maintained by NF service producer 202. NF service producer 202 must repeatedly check the records in its subscription database any time a change in its status occurs so that it can determine whether any notifications to NF service consumers are required. NF service producer 202 must also maintain timers for each subscription to determine the expiration time of each subscription. Processing subsequent messages associated with existing subscriptions, such as update or delete messages, also consumes processor cycles of producer NF 202. Because there is no checking or enforcement of the number of subscriptions that match operator-defined criteria, excessive subscriptions can overwhelm the processing capacity of NF service producer 202.

Figure 3:
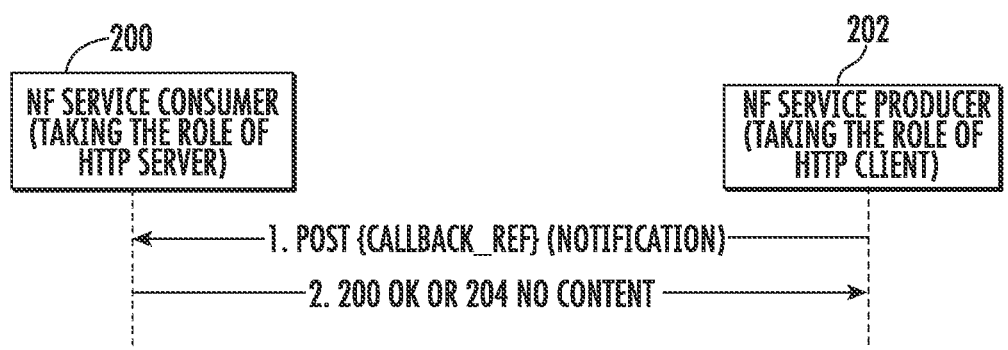
FIG. 3 is a message flow diagram illustrating exemplary messages exchanged when a producer NF sends a notification regarding a subscription to a consumer NF.

FIG. 3 illustrates exemplary messages exchanged between NF service consumer 200 and NF service producer 202 when an event triggering the notification requested by a subscription occurs. Referring to FIG. 3, in line 1 of the message flow diagram, NF service producer 202 determines that an event has occurred that matches the criteria specified by NF service consumer 200 to receive a notification. For example, if NF service producer is an NRF, the event may be receipt of a message from a producer NF that the producer NF is available or unavailable to provide a particular service for which NF service consumer 200 has subscribed to receive a notification. When this this event occurs, NF service producer 202 sends an HTTP Post message to NF service consumer 200 including the data requested by the subscription. During the notification, the callback reference provided during the subscription process is used for sending the Post request from NF service producer 202 to NF service consumer 200. When sending the notification, NF service producer 202 is functioning as an HTTP client, and NF service consumer 200 is functioning as an HTTP server. In line 2 of the message flow diagram illustrated in FIG. 3, NF service consumer 200 responds to the notification with a 200 OK or a 204 No Content message depending on whether the Post message corresponded to an expected notification regarding a subscription.

Figure 4:
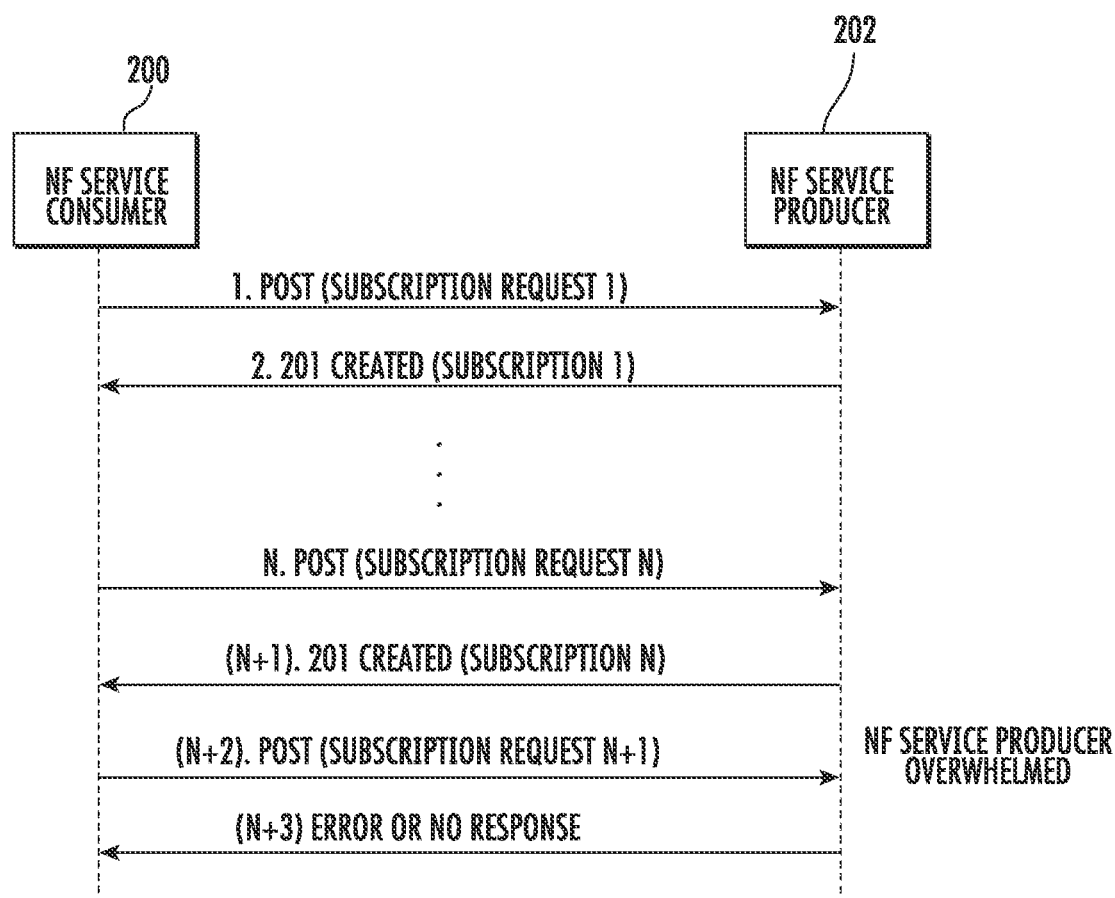
FIG. 4 is a message flow diagram illustrating exemplary messages exchanged when an NF service consumer overwhelms the processing resources of an NF service producer due to excessive subscriptions.

In light of the large numbers of NF service consumers and the number of subscriptions that can be created by a single NF service consumer, the resources of the NF service producer can be overwhelmed. This scenario is illustrated in FIG. 4. Referring to FIG. 4, in line 1, NF service consumer 200 sends a Post message containing subscription request 1 to NF service producer 202. NF service producer 202 receives the Post message containing the subscription request, authenticates the subscribing node, and responds with a 201 Created message in line 2 indicating that the subscription was successfully created. It should be noted that there is no check as to the number of subscriptions by NF service consumer 200, the PLMN of NF service consumer 200, the total number of subscriptions, etc. Accordingly, NF service consumer 200 may continue to create N subscriptions with NF service producer 202 until the processing, memory, or storage resources of NF service producer 202 are exhausted. The Nth subscription is indicated by line N. NF service producer 202 creates the Nth subscription and responds with a 201 Created message in line N+1.

In line N+2, NF service consumer 200 sends another subscription request for creating subscription N+1 to NF service producer 202. The processing resources of NF service producer 202, at this point, are overwhelmed. Accordingly, NF service producer 202 either sends an error message in line N+3 or is unable to respond to NF service consumer 200 because NF service producer 202 does not have sufficient processing resources to generate a response.

The scenario illustrated in FIG. 4 is undesirable because NF service producer 202 is incapable of processing new subscription requests and may not even be able to handle existing subscriptions, because it lacks sufficient resources due to excessive subscriptions from NF service consumer 200. However, there may be some scenarios when an NF service consumer is allowed to create multiple subscriptions, depending on the NF type, PLMN, or other parameters.

Figure 5:
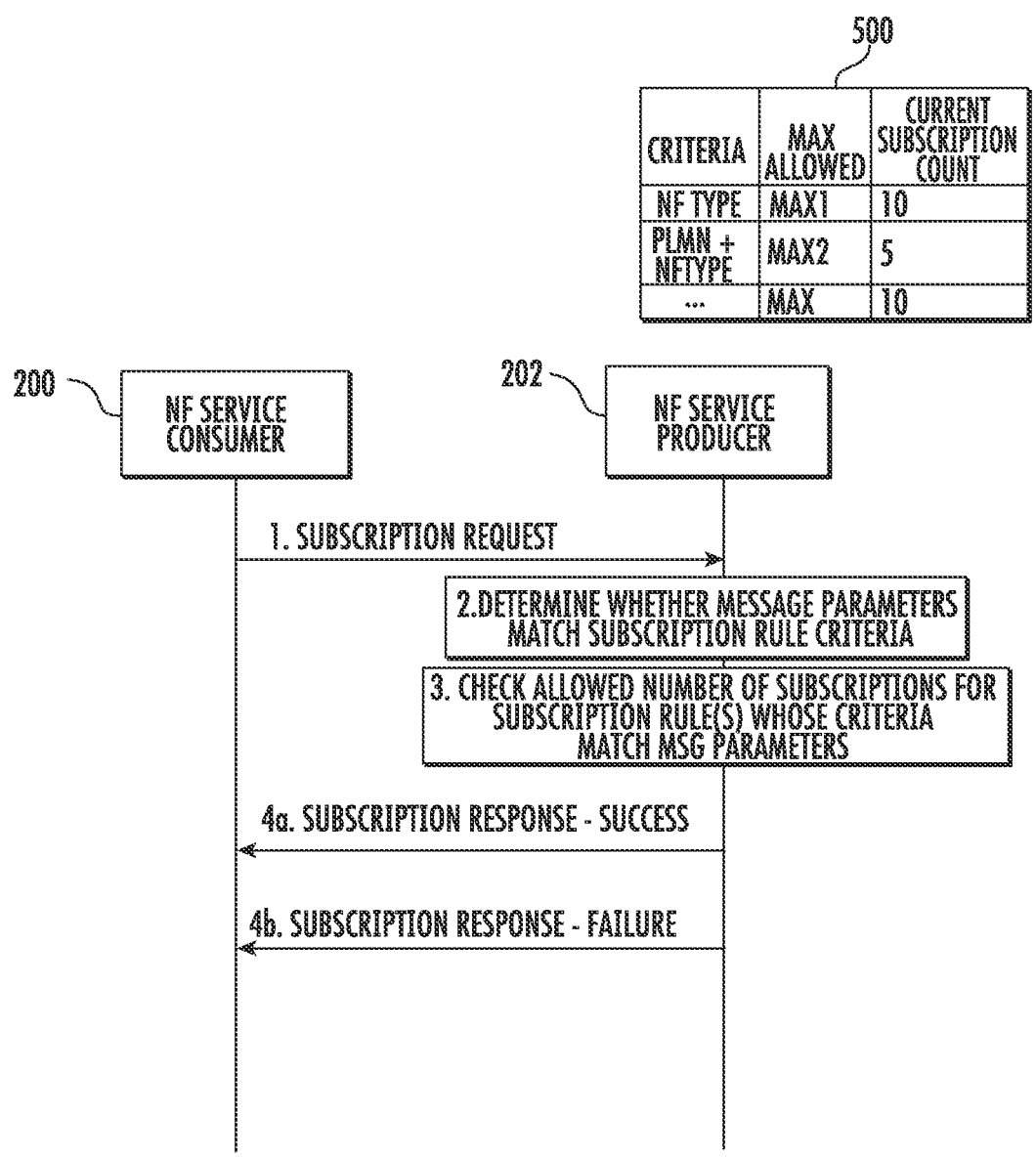
FIG. 5 is a message flow diagram illustrating exemplary messages exchanged for policing numbers of subscriptions allowed for consumer NFs based on operator-configured criteria.

FIG. 5 is a message flow diagram illustrating an exemplary exchange of messages where NF service producer 202 limits the number of allowed subscriptions based on operator-configured criteria. Referring to FIG. 5, in step 1 of the message flow diagram, NF service consumer 200 sends a subscription request to NF service producer 202. NF service producer 202 extracts parameters from the subscription request message, such as an identity of the NF service consumer from the OAuth token or the transport layer security (TLS) certificate in the service request message, the source PLMN, the NF type, or other suitable parameters. In step 2, NF service producer determines Parameters extracted from the subscription request message match any of a plurality of rules in a subscription database 500. If the message parameters match any of the rules in subscription database 500, NF service producer 202 increments a subscription count for the corresponding rule or rules and determines whether the subscription count exceeds the allowed number of subscriptions for the rule. In the example subscription database illustrated in FIG. 5, the rule criteria include NF type, a combination of PLMN and NF type, and a wild card rule for a maximum total number of subscriptions that the NF service producer 202 can handle. It should be noted that in the example database, "NF type" represents a type of NF that would be specified by the network operator. For example, an operator may specify a maximum allowed number of subscriptions for an NF type of AMF that is different from a maximum number of allowed subscriptions from a UDM. In addition, a current count of the number of subscriptions being handled by NF service producer 202 is stored for each rule. It should be noted that if criteria from a message matches multiple rules, in one implementation, the new subscription may be rejected if any one of the maximum allowed numbers of subscriptions for the matching rules is exceeded.

If the subscription count for the matching rule(s) does not exceed the maximum allowed number of subscriptions specified for the rule, NF service producer 202 may respond as indicated in step 4A with a subscription response message indicating successful creation of the subscription. As illustrated above, the subscription response may be a 201 Created message. If the subscription count for the matching rule exceeds the maximum allowed number of subscriptions for the rule, NF service producer 202 may send a failure response message as illustrated in step 4B that indicates failure to create the subscription.

Table 1 shown below illustrates subscription count data in more detail that may be included in subscription database 500.

TABLE 1

Example Subscription Rules Data for NF Subscription Database

| PLMN | NF Type | NF Instance ID | Max Allowed Subscriptions | Current Subscription Count |
|---|---|---|---|---|
| PLMN1 | * | * | MAX1 | 1 |
| PLMN1 | NFTYPE1 | * | MAX2 | 1 |
| PLMN1 | NFTYPE2 | * | MAX3 | 0 |
| * | NFTYPE1 | * | MAX4 | 1 |
| * | * | NFINSTANCEID1 | MAX5 | 1 |

In Table 1, each row corresponds to a rule for comparing against new subscription requests. Each rule includes rule criteria, a corresponding maximum number of allowed subscriptions, and a current subscription count of subscriptions currently being handled by the NF that match each rule. The first rule in Table 1 indicates that for PLMN1, the maximum allowed number of subscriptions is MAX1. The second rule in Table 1 indicates that for the criteria PLMN1 and NFTYPE1, the maximum number of allowed subscriptions is MAX2. The third rule in Table 1 indicates that for PLMN1 and NFTYPE2, the maximum number of allowed subscriptions is MAX3. The fourth rule in Table 1 indicates that the maximum number of allowed subscriptions for NFTYPE1 is MAX4. The fifth rule in Table 1 indicates that the maximum number of allowed for NFINSTANCEID1 is MAX5.

A subscription count is also maintained for each rule. As indicated above, the subscription count is the current number of subscriptions being handled by the NF that match each rule. In Table 1, if a subscription request from an NF with NFINSTANCEID1 and an NF type of NFTYPE1 is received from PLMN1, the subscription counts of rules 1, 2, 4, and 5 will each be incremented because the subscription request matches the criteria specified for each of these rules. If the maximum number of subscriptions for any of the matching rules would be exceeded, in one implementation, the subscription request would be rejected.

Figure 6:
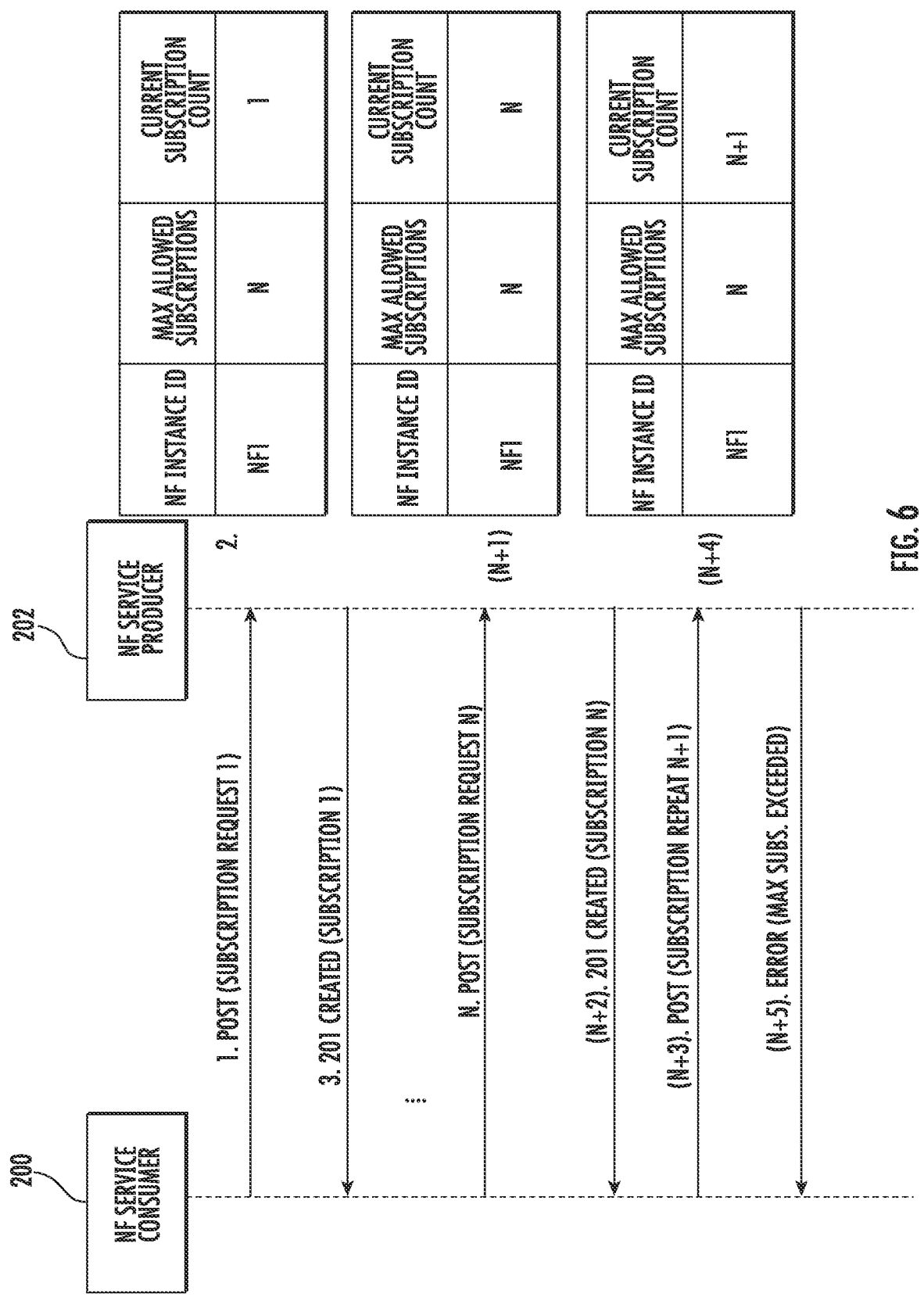
FIG. 6 is a message flow diagram illustrating exemplary messages exchanged where policing numbers of subscriptions allowed for consumer NFs based on operator-configured criteria results in preventing establishment of a subscription in response to an operator-defined maximum limit being exceeded.

FIG. 6 is a message flow diagram illustrating the operation of NF service producer 202 in refusing a subscription if the maximum number of allowed subscriptions for a matching rule is exceeded. Referring to FIG. 6, in step 1, NF service consumer 200 sends a Post message with a subscription request for subscription1 to NF service producer 202. In step 2, NF service producer 202 locates a matching rule, which in the example in FIG. 6 only includes the NF instance ID for NF1, increments the subscription count for the matching rule, and determines whether the incremented subscription count would cause the maximum number of allowed subscriptions to be exceeded. In the example rule in FIG. 6, the maximum number of allowed subscriptions for the rule is N, where N>1. Accordingly, the Post message for subscription request 1 does not cause the maximum number of allowed subscriptions to be exceeded, and, in step 3, NF service producer 202 creates the subscription and sends a message to NF service consumer 200 indicating that subscription 1 has been created.

NF service producer 202 continues to accept new subscriptions from NF service consumer 200. In step N of the message flow in FIG. 6, NF service consumer 200 sends a Post message for subscription N to NF service producer 202. In this example it is assumed that subscription N is the Nth active subscription received from NF service consumer 200. In step N+1, NF service producer 202 increments the current subscription count, which results in the current count being equal to N. Accordingly, because the subscription count is equal to the maximum number of allowed subscriptions, in step N+2, NF service producer 202 creates the subscription and responds to NF service consumer 200 with a 201 Created message indicating that subscription N has been created.

In step N+3, NF service consumer 200 sends a Post message to NF service producer 202 for creating the (N+1)th subscription. In step N+4, NF service producer 202 increments the current subscription count and determines whether the current subscription count would exceed the maximum number of allowed subscriptions. In this example, the maximum number of allowed subscriptions is N, which is less than the incremented current subscription count (N+1). Accordingly, NF service producer 202 does not create the new subscription and optionally sends a message to NF service consumer 200 indicating that the maximum number of subscriptions has been exceeded, as indicated by step N+5.

Thus, using the steps in FIG. 6, by maintaining a maximum allowed number of subscriptions on a per rule basis, NF service producer 202 reduces the likelihood of an effective denial of service attack from an NF service consumer. In the other examples illustrated above, the effectiveness of such an attack from a PLMN, an NF type, or any other operator specified criteria can be reduced. The subject matter described herein also reduces the likelihood of unintentional denial of service, i.e., when an NF consumer sends too many legitimate subscription requests to an NF service producer. It should also be noted that the maximum numbers of allowed subscriptions for individual rules in database 500 may be set to ensure relative allocations of resources among consumer NFs in accordance with the network operator's requirements. The total number of allowed subscriptions across all rules or as specified by a default rule with wildcard criterial be set such that when the maximum total number of allowed subscriptions is reached, NF service producer 202 may have an engineered amount of reserved processing, storage, and/or memory capacity available to handle NF service producer operations.

Figure 7:
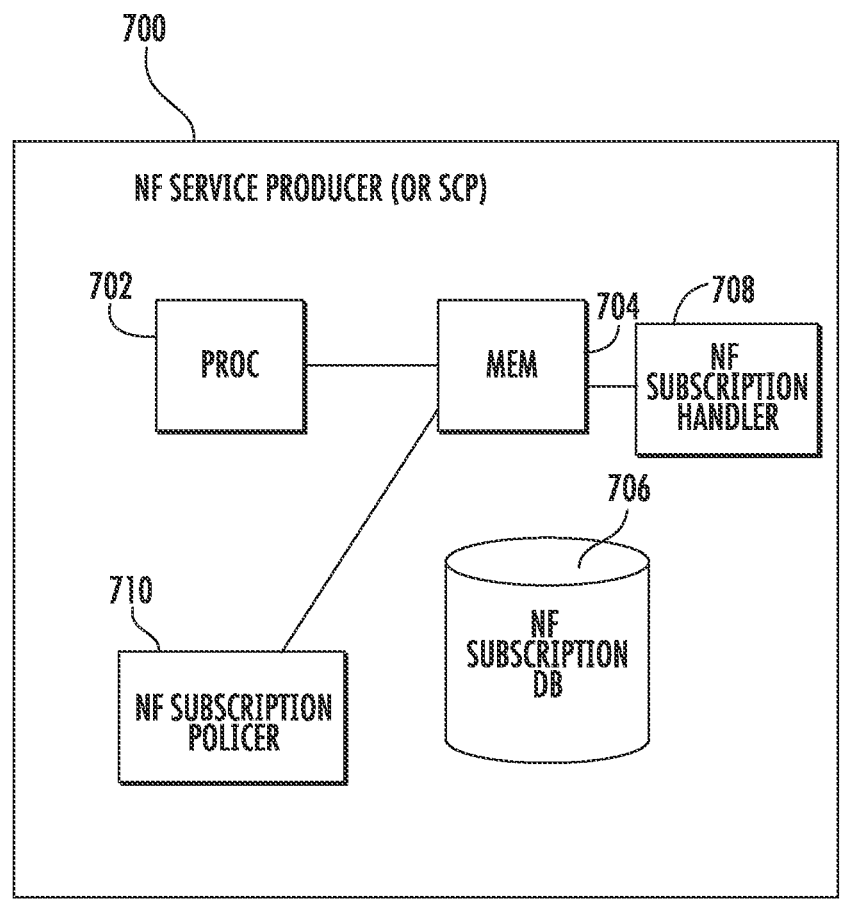
FIG. 7 is a block diagram illustrating a consumer NF or SCP capable of mitigating DoS attacks by policing numbers of subscriptions from consumer NFs based on operator-configured criteria.

FIG. 7 is a block diagram illustrating an exemplary architecture for an NF 700 that performs NF subscription policing as described herein. It should be noted that the subscription policing functionality described above with respect to NF service producer 202 may alternatively be implemented at an SCP, as an SCP routes subscription request messages and consequently can be the location at which subscription request messages are policed to ensure that maximum numbers of allowed subscriptions for producer NFs are not exceeded. Accordingly, in FIG. 7, NF 700 may be a producer NF, such as NF service producer 202 or an SCP that routes messages to producer NFs and that performs subscription policing on behalf of producer NFs.

In FIG. 7, NF 700 includes at least one processor 702 and a memory 704. NF 700 may also include an NF subscription database 706 that, in the case where NF 700 is an NF service producer, stores data relating to subscriptions. NF subscription database 706 may also store (in the case where NF 700 is an NF service producer or an SCP) the maximum allowed subscription rules described above with regard to Table 1. NF 700 further includes an NF subscription handler 708 in the case where NF is an NF service producer that receives and processes subscriptions from consumer NFs. In the case where NF 700 is an NF service producer or a SCP, NF 700 may include an NF subscription policer 710 that performs the policing described above to ensure that the maximum numbers of allowed subscriptions for rules provisioned in NF subscription database 706 are not exceeded.

In the case where NF 700 is an SCP, subscription database 706 may be provisioned with subscription policing rules, such as those illustrated in Table 1, on a per NF service producer basis for each NF service producer to which the SCP routes subscription request messages. Using a centralized node, such as an SCP, to police subscriptions on behalf of multiple NF service producers may be advantageous from a scalability and efficiency standpoint. If a subscription request passes subscription policing, NF 700, functioning as an SCP, may route the subscription request message to a producer NF that can create the requested subscription. If a subscription request message does not pass the subscription policing, NF 700 may discard the message instead of routing the message to a producer NF, thereby preventing the requested subscription from being established.

Figure 8:
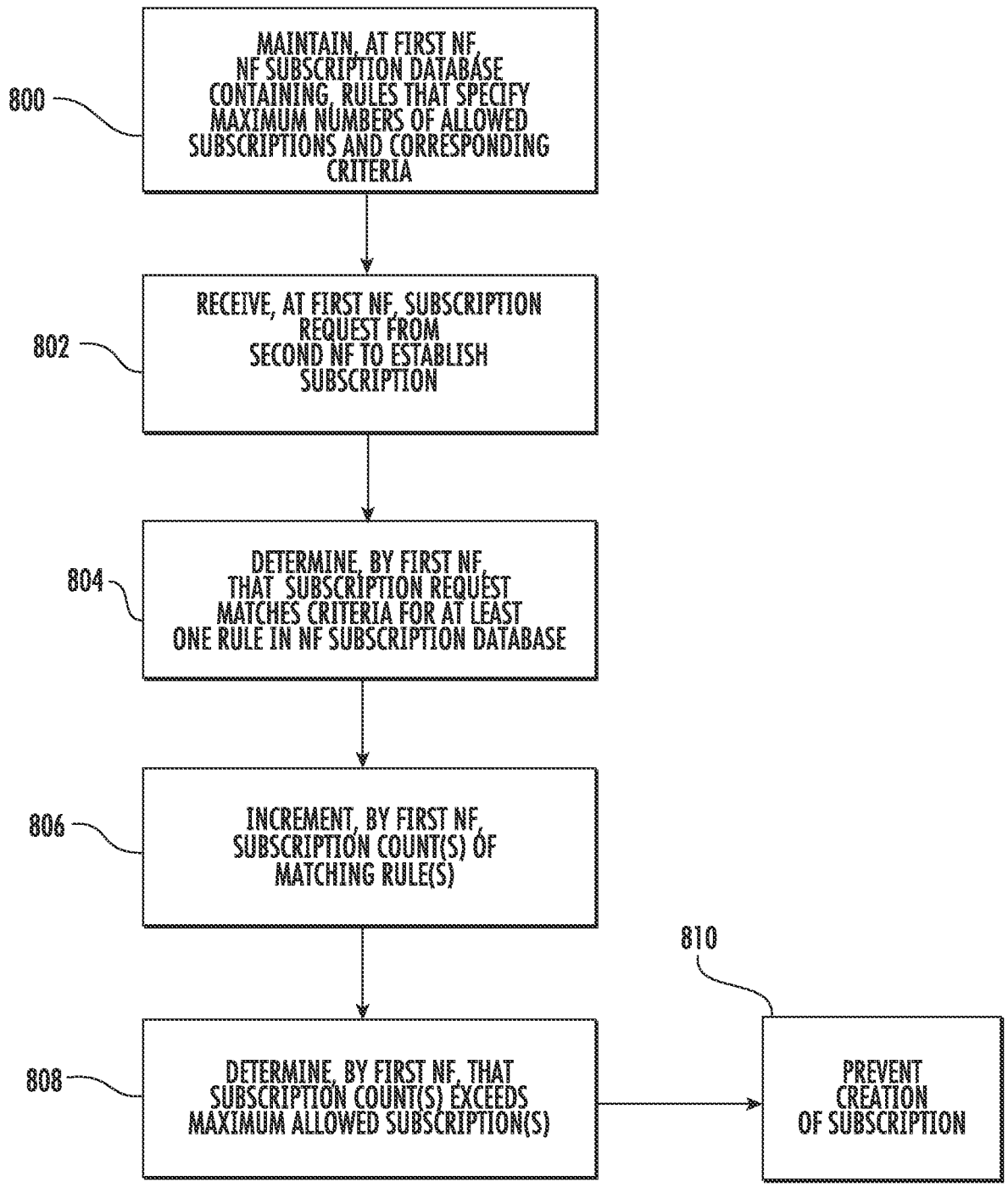
FIG. 8 is a flow chart illustrating an exemplary process for mitigating DoS attacks by policing numbers of subscriptions from consumer NFs based on operator-configured criteria.

FIG. 8 is a flow chart illustrating an exemplary process for mitigating a denial of service attack at a producer NF or an SCP based on subscription rules. Referring to FIG. 8, in step 800, the process includes maintaining, at a first NF, an NF subscription database containing rules that specify maximum numbers of allowed subscriptions and corresponding criteria. For example, the first NF may be a producer NF or an SCP. The NF subscription database may specify criteria, such as NF instance ID, PLMN ID, NF type, or any combination thereof, and may specify maximum numbers of allowed subscriptions matching each set of criteria.

In step 802, the process includes receiving, at the first NF, a subscription request from a second NF to establish a subscription. For example, the producer NF or SCP may receive a subscription request to receive notifications of updates regarding the status of either the producer NF that received the subscription request or, in the case of an SCP, of a producer to which the SCP routes messages on behalf of the consumer NF. In step 804, the process includes, determining, by the first NF, that the subscription request matches criteria for at least one rule in the NF subscription database. For example, the producer NF or SCP may extract parameters, such as the NF instance ID, NF type, PLMN ID, etc., from the subscription request message and use these parameters to perform a lookup in the NF subscription database. The first NF may compare the parameters extracted from the message to rule criteria for each rule in the database and identify one or more matching rules.

In step 806, the process includes incrementing, by the first NF, subscription counts of the matching rules. For example, the producer NF or SCP may maintain a subscription count for each rule that indicates the number of active subscriptions maintained by the producer NF or by producer NFs to which the SCP routes messages that match the criteria for a given rule. When a request for a new subscription is received, the producer NF or SCP may update or increment the subscription count for each matching rule.

In step 808, the process includes determining, by the first NF, that the subscription count exceeds the maximum number of allowed subscriptions for one or more of the matching rules. For example, the producer NF or SCP may update the subscription count for each rule identified as matching the parameters extracted or derived from the current subscription request and determine that the maximum count for one of the rules is exceeded.

In step 810, the process includes preventing creation of the subscription. For example, if the producer NF or SCP determines that the maximum allowed subscription count for any of the rules would be exceeded by creating a subscription for the current subscription request, the producer NF or SCP may prevent the first subscription from being established, drop or discard the subscription request message, and optionally send an error message to the consumer NF that sent the subscription request.

Thus, the subject matter described herein mitigates denial of service attacks by reducing the likelihood of excessive subscriptions at a producer NF or SCP. As stated above, the subject matter described herein is applicable to any producer NF that utilizes subscriptions to communicate with consumer NFs or by an SCP that routes subscription request messages to producer NFs. Examples of producer NFs at which the subject matter described herein could be implemented include the NRF, the PCF, the BSF, the NSSF, the UDR, the UDM, or the NEF. Implementing the subject matter described herein at a centralized node, such as an NRF or SCP is believed to be particularly advantageous as such nodes may be at increased risk for denial of service attacks due to the number of subscriptions that they may handle.

The disclosure of each of the following references is hereby incorporated herein by reference in its entirety.

REFERENCES 1. 3GPP TS 23.502 V16.7.0 (2020-12), 3rd Generation Partnership Project; Technical Specification Group Services and System Aspects; Procedures for the 5G System (5GS); Stage 2, (Release 16).
2. 3GPP TS 23.501 V16.7.0 (2020-12), 3rd Generation Partnership Project; Technical Specification Group Services and System Aspects; System Architecture for the 5G System (5GS), Stage 2; (Release 16).
3. 3GPP TS 29.510 V17.0.0 (2020-12), 3rd Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mitigating denial of service (DoS) attacks at a network function (NF), the method comprising:
   maintaining, at a first NF, an NF subscription database containing rules that specify maximum numbers of allowed subscriptions and corresponding rule criteria;
   receiving, at the first NF and from a second NF, a subscription request for establishing a subscription;
   determining, by the first NF, that the subscription request matches criteria for at least one rule in the NF subscription database;

incrementing, by the first NF, at least one count of a number of subscriptions for the at least one rule;

determining, by the first NF, that the at least one count of the number of subscriptions exceeds a maximum number of allowed subscriptions for the at least one rule; and in response to determining that the at least one count of the number of subscriptions exceeds the maximum number of allowed subscriptions for the at least one rule, preventing establishment of the subscription.

2. The method of claim 1 wherein the first NF comprises a producer NF.

3. The method of claim 1 wherein the first NF comprises a service communication proxy (SCP).

4. The method of claim 1 wherein maintaining the NF subscription database includes maintaining the database with at least one rule with criteria specifying NF type.

5. The method of claim 4 wherein accessing the NF subscription database includes extracting or inferring NF type information from the subscription request and using the NF type information extracted or inferred from the subscription request as a key to match against the criteria specified for the rules in the database.

6. The method of claim 1 wherein maintaining the NF subscription database includes maintaining the database with at least one rule specifying criteria of public land mobile network (PLMN).

7. The method of claim 6 wherein accessing the NF subscription database includes extracting or inferring PLMN information of the second NF from the subscription request and using the PLMN information of the second NF extracted or inferred from the subscription request as a key to match against the criteria specified for the rules in the database.

8. The method of claim 1 wherein maintaining the NF subscription database includes maintaining the database with at least one rule specifying criteria of NF instance ID and wherein accessing the NF subscription database includes extracting an NF instance ID from the subscription request and using the NF instance ID extracted from the subscription request as a key to match against the criteria specified for the rules in the database.

9. The method of claim 1 wherein maintaining the NF subscription database includes maintaining a count of a number of subscriptions currently being handled by the first NF that match the criteria for each of the rules.

10. The method of claim 9 wherein:

determining, by the first NF, that the subscription request matches criteria for at least one rule in the NF subscription database includes determining that the subscription request matches criteria for a plurality of rules in the database;

incrementing, by the first NF, at least one count of a number of subscriptions for the at least one rule includes incrementing the count for each of the rules with criteria that match the subscription request; and determining, by the first NF, that the at least one count of the number of subscriptions exceeds a maximum number of allowed subscriptions for the at least one rule includes determining that the count of the number of subscriptions for any of the rules with criteria that match the subscription request exceeds the maximum number of allowed subscriptions for the rule.

11. A system for mitigating denial of service (DoS) attacks at a network function (NF), the system comprising:

a first NF including at least one processor and a memory;

an NF subscription database embodied in the memory and containing rules that specify maximum numbers of allowed subscriptions and corresponding rule criteria; and an NF subscription policer for receiving, from a second NF, a subscription request for establishing a subscription, determining, that the subscription request matches criteria for at least one rule in the NF subscription database, incrementing, at least one count of a number of subscriptions for the at least one rule, determining, that the at least one count of the number of subscriptions exceeds a maximum number of allowed subscriptions for the at least one rule, and, in response to determining that the at least one count of the number of subscriptions exceeds the maximum number of allowed subscriptions for the at least one rule, preventing establishment of the subscription.

12. The system of claim 11 wherein the first NF comprises a producer NF.

13. The system of claim 11 wherein the first NF comprises a service communication proxy (SCP).

14. The system of claim 11 wherein the NF subscription database includes at least one rule with criteria specifying an NF type.

15. The system of claim 14 wherein, in accessing the NF subscription database, the NF subscription policer is configured to extract or infer NF type information of the second NF from the subscription request and use the NF type information of the second NF extracted or inferred from the subscription request as a key to match against the criteria specified for the rules in the database.

16. The system of claim 11 wherein the NF subscription database includes at least one rule with criteria specifying a public land mobile network (PLMN) and wherein, in accessing the NF subscription database, the NF subscription policer is configured to extract or infer a PLMN identifier for the second NF from the subscription request and use the PLMN identifier extracted or inferred from the subscription request as a key to match against the criteria specified for the rules in the database.

17. The system of claim 11 wherein the NF subscription database includes at least one rule with criteria specifying an NF instance ID and wherein, in accessing the NF subscription database, the NF subscription policer is configured to extract an NF instance ID from the subscription request and use the NF instance ID extracted from the subscription request as a key to match against the criteria specified for the rules in the database.

18. The system of claim 11 wherein the NF subscription policer is configured to maintain a count of a current number of subscriptions being handled by the first NF that match criteria for each of the rules.

19. The system of claim 18 wherein:

in determining that the subscription request matches criteria for at least one rule in the NF subscription database, the NF subscription policer is configured to determine that the subscription request matches criteria for a plurality of rules in the database;

in incrementing at least one count of a number of subscriptions for the at least one rule, the NF subscription policer is configured to increment the count for each of the rules with criteria that match the subscription request; and in determining that the at least one count of the number of subscriptions exceeds a maximum number of allowed subscriptions for the at least one rule, the NF subscription policer is configured to determine that the count of the number of subscriptions for any of the rules with criteria that match the subscription request exceeds the maximum number of allowed subscriptions for the rule.

20. A non-transitory computer readable medium having stored thereon executable instructions that when executed by a processor of a computer control the computer to perform steps comprising:

maintaining, at a first network function (NF), an NF subscription database containing rules that specify maximum numbers of allowed subscriptions and corresponding rule criteria;

receiving, at the first NF and from a second NF, a subscription request for establishing a subscription;

determining, by the first NF, that the subscription request matches criteria for at least one rule in the NF subscription database;

incrementing, by the first NF, at least one count of a number of subscriptions for the at least one rule;

determining, by the first NF, that the at least one count of the number of subscriptions exceeds a maximum number of allowed subscriptions for the at least one rule; and in response to determining that the at least one count of the number of subscriptions exceeds the maximum number of allowed subscriptions for the at least one rule, preventing establishment of the subscription.

* * * * *

UNITED STATES PATENT AND TRADEMARK OFFICE
CERTIFICATE OF CORRECTION

PATENT NO. : 11,582,258 B2
APPLICATION NO. : 17/167319
DATED : February 14, 2023
INVENTOR(S) : Rajput et al.

It is certified that error appears in the above-identified patent and that said Letters Patent is hereby corrected as shown below:

In the Specification

In Column 2, Line 7, delete "uified" and insert -- unified --, therefor.

Signed and Sealed this
Nineteenth Day of December, 2023

Katherine Kelly Vidal
*Director of the United States Patent and Trademark Office*